UNITED STATES PATENT OFFICE.

SAMUEL PEACOCK, OF PHILADELPHIA, PENNSYLVANIA, ASSIGNOR, BY MESNE ASSIGNMENTS, TO AGRICULTURAL RESEARCH CORPORATION, OF NEW YORK, N. Y., A CORPORATION OF NEW YORK.

VOLATILE COMPOUNDS AND PROCESS OF PRODUCING SAME.

1,134,411.

Specification of Letters Patent. Patented Apr. 6, 1915.

No Drawing. Application filed April 16, 1914. Serial No. 832,808.

*To all whom it may concern:*

Be it known that I, SAMUEL PEACOCK, a citizen of the United States, residing at Philadelphia, in the county of Philadelphia and State of Pennsylvania, have invented certain new and useful Improvements in Volatile Compounds and Processes of Producing Same; and I do hereby declare the following to be a full, clear, and exact description of the invention, such as will enable others skilled in the art to which it appertains to make and use the same.

This invention relates to a process of producing volatile compounds consisting of carbon and nitrogen combined with a third element, and also to the new volatile products produced by this process, and has for its object the fixation of free nitrogen in a manner more efficient and less expensive than the methods heretofore proposed.

With these and other objects in view the invention consists in the new product and novel steps constituting my process more fully hereinafter disclosed and particularly pointed out in the claims.

In carrying out my process I prepare a charge of finely divided carbon, an oxid of a metal, an alkali earth metal or of an alkali metal, suitably proportion the same, and preferably briquet it. I then introduce the charge into a suitable furnace, and lead gaseous nitrogen, or producer gas thereinto, when an electric current is turned on, or other suitable heating means are employed to raise the temperature to say substantially 1600° C. I prefer calcium oxid, and when it is used, I have reason to believe the following reaction takes place:—

I have now discovered that the carbonitrid thus formed in the high temperature zone of the furnace is in both a volatile and in a solid form. That is to say, one portion of my product is volatile at its temperature of formation, 1500° C., while another portion is a solid at such temperature. I have further discovered that the proportion of volatile carbonitrid to solid carbonitrid produced, is dependent in a measure upon the pressure existing in the furnace. That is to say, when the pressure in the furnace is above the normal, or above that of the atmosphere, the proportion of the volatile product is less than is the case when the pressure is at that of the atmosphere. I have further discovered that when the pressure is decreased below the normal, the amount of volatile product is increased. For example, when the pressure in the furnace is maintained for 45 minutes at 1000 m. m. of mercury, about 80% of the carbo-nitrid formed is votalized, while the remainder is found in a solid form in the charge; when the pressure is maintained at 760 m. m. for the same period, substantially all the carbo-nitrid is volatilized; and when the pressure is less than that of the atmosphere all the carbo-nitrid is volatilized in a period of time less than 45 minutes.

Either nitrogen gas, or producer gas, may be employed as above stated, and when producer gas is employed such gas may contain on the average about 60% nitrogen, $N_2$ and 38% carbon monoxid, $CO$, so that when nitrogen is removed by my process the producer gas is greatly improved and enriched by the carbon monoxid $CO$, generated by the reaction. Said producer gas can therefore later be utilized to greater advantage for combustion or other purposes. That is to say, from the carbo-nitrid equation, above, it is evident that for each volume of nitrogen fixed, an equal volume of carbon monoxid $CO$, is liberated, and joins the furnace gases. Now when producer gas is employed, having say 60% of nitrogen and 38% of carbon monoxid, and when one third or 20% of the nitrogen is fixed, it is evident that 20% of carbon monoxid will be added to the 38% of carbon monoxid already present. Accordingly the resulting mixture will contain 58% of carbon monoxid instead of its original 38%. It follows, therefore, that the producer gas by my process is not only purified of its nitrogen but it is also enriched by a substantial addition of carbon monoxid, causing it to become a valuable by-product.

In carrying out the process in order to avoid a serious retardation of the reaction it is desirable to maintain such a flow of nitrogen through the furnace that the partial pressure of the carbon monoxid gas present will not exceed say 400 to 450 millimeters of mercury.

The volatile carbo-nitrid thus produced may be recovered by leading it from the furnace and allowing it to solidify or condense in suitable chambers, or by absorption in water or other solutions. If recovered by condensation, the solid thus obtained may be subjected to the action of superheated steam at substantially 200° C., when the following reaction takes place:—

$$Ca_3N_2.C_3N_4 + 9H_2O = 3CaCO_3 + 6NH_3.$$

If the volatile carbo-nitrid is recovered as a solution its combined nitrogen may be converted into ammonia by heating the solution to substantially 200° C. in a suitably closed vessel.

If the volatile product is allowed to condense as, for example in the form of a loose powder, it is apt to absorb any moisture with which it might come in contact and also to rapidly oxidize if exposed to free oxygen, and therefore care should be taken to prevent the exposure of this new product to water vapor or to the atmosphere.

In actual tests using calcium oxid and nitrogen gas and a temperature of 1600° C. for 45 minutes, analyses show that over 85% of the calcium present, in the calcium oxid carried by the charge, appeared in the volatile carbo-nitrid produced. These analyses further show chemically combined nitrogen as well as chemically combined carbon in the volatilized products in the proportion required by the formula $$Ca_3N_2.C_3N_4.$$

It is therefore certain that my volatile product is a carbo-nitrid and not a nitrid.

The solid portion of the carbo-nitrid which is formed simultaneously with the volatile portion remains in the residue passing through the furnace and its combined nitrogen may be recovered in the form of ammonia by treating said residue with water at about 200° C. in a suitably closed vessel.

It will thus be seen that my process fixes atmospheric nitrogen without the use of calcium carbid as a raw material and at a moderate temperature as compared to that necessary to make the carbid.

My new volatile and solid products further differ from calcium cyanamid in that the hydrolysis of the same does not produce cyanamid, $H_2CN_2$, as is the case with commercial calcium cyanamid. On the other hand, the reactions of my new product lead to the supposition that it is a polymer of cyanamid in that it gives some of the characteristic reactions of melamin, such as a white precipitate with soluble silver and lead salts.

It is obvious that oxids other than calcium oxid may also be utilized in fixing nitrogen by my process, for example the oxids of the alkali, the alkali earth metals, of the non-metals, as well as the oxids of the heavy metals such as iron, zinc, lead, etc.

It is obvious that those skilled in the art may vary the details of my process without departing from the spirit of my invention, and therefore I do not wish to be limited to the above disclosure except as may be required by the claims.

What I claim is:—

1. The process of producing a carbonitrid a portion of which is in a volatile form, which consists in preparing a mixture of a suitable oxid and carbon; subjecting said mixture in an atmosphere containing free nitrogen to a temperature sufficient to produce said portion of volatile carbo-nitrid and suitably recovering said volatile portion, substantially as described.

2. The process of producing a volatile carbo-nitrid, which consists in preparing a mixture of a suitable oxid and carbon; subjecting said mixture in an atmosphere containing free nitrogen to a temperature sufficient to produce said volatile carbo-nitrid and suitably recovering the latter, substantially as described.

3. The process of producing a volatile alkali earth carbo-nitrid, which consists in preparing a mixture of an alkali earth oxid and carbon; subjecting the same in an atmosphere containing nitrogen, to a temperature sufficient to produce said carbonitrid and suitably recovering the latter, substantially as described.

4. The process of producing a volatile calcium carbo-nitrid, which consists in preparing a mixture of calcium oxid and carbon; subjecting the same in an atmosphere containing nitrogen but substantially devoid of free oxygen to a temperature sufficient to produce said carbo-nitrid and suitably recovering the latter, substantially as described.

5. The process of producing a volatile calcium carbo-nitrid, which consists in preparing a mixture of calcium oxid and carbon; subjecting the same in an atmosphere of nitrogen substantially free from chemically active oxygen and to a temperature sufficient to produce said carbo-nitrid and suitably recovering the latter, substantially as described.

6. The process of producing a volatile calcium carbo-nitrid which consists in preparing a mixture of calcium oxid and carbon; subjecting said mixture in an atmosphere of nitrogen to a temperature sufficient to produce said carbo-nitrid, and recovering the latter in a medium devoid of chemically active oxygen, substantially as described.

7. The process of producing a volatile calcium carbo-nitrid which consists in preparing a mixture of calcium oxid and carbon; subjecting said mixture in an atmosphere of producer gas to a temperature sufficient to produce said carbo-nitrid, and recovering the latter in a medium devoid of chemically active oxygen, substantially as described.

8. The process of producing a volatile calcium carbo-nitrid, which consists in preparing a mixture of calcium oxid and carbon; and subjecting the same in an atmosphere containing free nitrogen to a temperature sufficient to produce said carbo-nitrid thereby causing carbon-monoxid to be evolved while maintaining the partial pressure of the carbon-monoxid present below 450 millimeters of mercury, substantially as described.

9. The herein described new product containing chemically combined carbo-nitrogen and an alkali earth metal the same being volatile at its temperature of formation, capable of forming a soluble white powder and of producing a white precipitate with soluble silver and lead salts, as well as producing ammonia when subjected to the action of hot water under pressure, substantially as described.

10. The herein described new product containing chemically combined carbon, nitrogen and an alkali metal, the same being volatile at 1500° C., capable of forming a soluble white powder and of producing a white precipitate with soluble silver and lead salts, as well as producing ammonia when subjected to the action of water at 200° C., substantially as described.

11. The herein described new product containing chemically combined carbon, nitrogen and a metal, the same being capable of forming a soluble white powder and of producing a white precipitate with soluble silver and lead salts, as well as producing ammonia when subjected to the action of water at 200° C., substantially as described.

12. The process of producing a volatile alkali metal carbo-nitrid, which consists in preparing a mixture of an alkali metal oxid and carbon; subjecting the same in an atmosphere containing nitrogen, to a temperature sufficient to produce said carbo-nitrid and suitably recovering the latter, substantially as described.

13. The process of producing a volatile metal carbo-nitrid, which consists in preparing a mixture of a metal oxid and carbon; subjecting the same in an atmosphere containing nitrogen but substantially devoid of free oxygen to a temperature sufficient to produce said carbo-nitrid and suitably recovering the latter, substantially as described.

14. The process of simultaneously fixing nitrogen and enriching producer gas which consists in preparing a mixture of carbon and suitable oxid; feeding producer gas containing nitrogen to said mixture; raising the temperature of said mixture sufficiently to cause some of the nitrogen present to be chemically fixed, and the carbon monoxid evolved to be added to said producer gas and suitably recovering the nitrogen containing product thus produced, substantially as described.

15. The process of producing a volatile product containing combined nitrogen, which consists in preparing a mixture of a suitable oxid and carbon, subjecting said mixture in an atmosphere containing free nitrogen to a temperature sufficient to produce said volatile product and suitably recovering the latter, substantially as described.

16. The process of producing a volatile product containing a metal, an alkali metal, or an alkali earth metal combined with nitrogen, which consists in preparing a mixture of a suitable oxid of said metal; said alkali metal or said alkali earth metal and carbon, subjecting said mixture in an atmosphere containing free nitrogen to a temperature sufficient to produce said volatile product and suitably recovering the latter, substantially as described.

In testimony whereof I affix my signature, in presence of two witnesses.

SAMUEL PEACOCK.

Witnesses:
T. A. WITHERSPOON,
FRANCES SIEBEL.